F. H. TRENHOLM.

Cart-Body.

No. 8,610. Reissued Mar. 4, 1879.

WITNESSES

Robert Everett

N. Clay Smith.

INVENTOR

Francis H. Trenholm

By Gilmore Smith & Co ATTORNEYS.

N. PETERS, PHOTO-LITHOGRAPHER, WASHINGTON, D. C.

UNITED STATES PATENT OFFICE.

FRANCIS H. TRENHOLM, OF CHARLESTON, SOUTH CAROLINA.

IMPROVEMENT IN CART-BODIES.

Specification forming part of Letters Patent No. 201,209, dated March 12, 1878; Reissue No. 8,610, dated March 4, 1879; application filed February 1, 1879.

*To all whom it may concern:*

Be it known that I, FRANCIS H. TRENHOLM, of the city and county of Charleston, and State of South Carolina, have invented a new and useful Improvement in Cart-Bodies, of which the following is a specification, reference being had to the accompanying drawings, in which—

Figure 1:
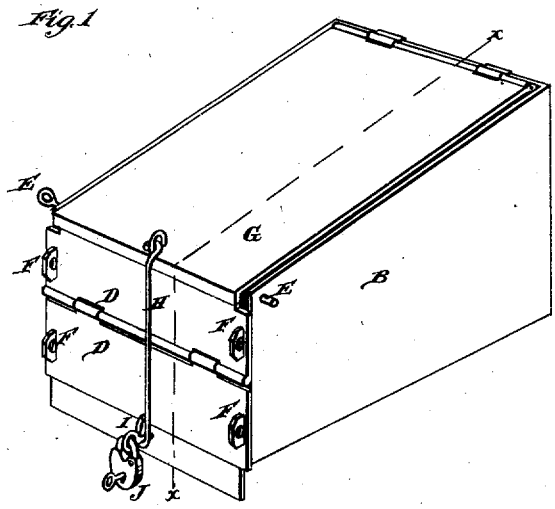
Figure 2:
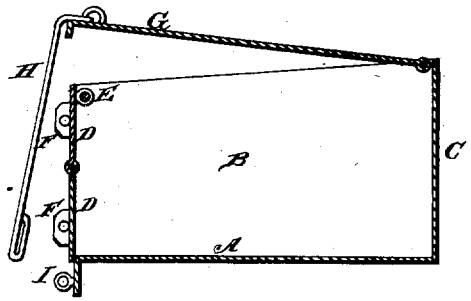

Figure 1 is a perspective view of one of my improved cart-bodies; and Fig. 2, a vertical longitudinal section of the same, taken on the line *x x* of Fig. 1.

The object of this invention is to furnish an improved cart-body for carrying coal, fruit, and other substances, which shall prevent the driver or other evil-disposed person from abstracting or meddling with the contents for purposes of fraud or mischief. The device is simple of construction and efficient in use.

The invention consists in a cart-body provided with a tail-board made in two parts, hinged to each other at their adjacent edges, hinged at its upper edge to the rear upper corners of the side-boards, and having its ends slotted to receive perforated lugs, by which it is secured to said side-boards.

It further consists in a cart-body provided with a hinged cover, hinged at its forward end to the upper edge of the front end-board, and provided with a hinged rod, bar, or hasp, to pass down across the tail-board, and, supporting the same, be locked to an eye or staple below the bottom of the cart-body by a padlock or other equivalent device.

Referring to the drawings, A represents the bottom, B the sides, and C the forward end, of a cart-body of usual construction. D represents the tail-board, made in two parts, hinged together at their adjacent edges. The upper edge of the tail-board is hinged to a rod, E, which passes through holes in the upper rear corners of the side-boards B, and is detachably secured in place by a key or other convenient means.

In the ends of the parts of the tail-board D are formed cross-slots to receive the lugs F, attached to the rear ends of the sides B. The lugs F are perforated to receive proper securing-keys.

With this construction the lower part of the tail-board may be released and turned up, or the upper part may be released and turned down; or both parts may be released and the said tail-board allowed to swing on the rod E, or it may be entirely detached, as desired.

G represents the cover, hinged, as shown, to the front end-board, C; and to this cover is hinged or otherwise secured a hasp, rod, or bar, H, provided with a slot or loop in its lower end, to receive an eyebolt or staple, I, attached to a proper support below the rear end of the bottom A, to which staple it is secured by padlock J, which locks both cover and tail-board to the body, so that it cannot be opened without breaking some of the parts.

In using the cart the design is for the party sending the load to lock the cart-body, seal up the key in an envelope having a receipt for the load written or printed thereon, and deliver said envelope to the driver. When the driver reaches his destination he delivers the sealed envelope to the party receiving the load, who opens the envelope, takes out the key, hands it to the driver, and sees him unlock the cart-body and deliver the goods. He then signs the receipt on the envelope and delivers it to the driver, who takes the key back to the party sending the load.

With this arrangement it will be impossible for the driver or others to abstract any part of a load while in transit.

Having thus described my invention, what I claim, and desire to secure by Letters Patent of the United States, is—

1. The cart-body B, having a hinged cover, G, and the connected hasp H, adapted to pass down over and support the tail-board D, combined with a locking device, as specified.

2. A cart-body provided with a tail-board, D, made in two parts, hinged to each other and to the side-boards, as shown, and slotted to receive lugs F, as set forth.

3. A cart-body provided with a cover, G, hinged to the front end-board, C, as shown, and provided with hasp H, to pass down across the tail-board and be locked to an eye or staple, I, below the bottom of said cart-body, as shown and specified.

In testimony that I claim the above I have hereunto subscribed my name in the presence of two witnesses.

FRANCIS H. TRENHOLM.

Attest:
JAMES J. SHEEHY,
ROBERT M. BARR.